W. WRIGHT.
COMBINED TYPE WRITING AND COMPUTING MACHINE.
APPLICATION FILED DEC. 1, 1911.

1,271,982.

Patented July 9, 1918.
3 SHEETS—SHEET 1.

WITNESSES:

INVENTOR
Walter Wright
BY
ATTORNEY

W. WRIGHT.
COMBINED TYPE WRITING AND COMPUTING MACHINE.
APPLICATION FILED DEC. 1, 1911.

1,271,982.

Patented July 9, 1918.
3 SHEETS—SHEET 3.

WITNESSES:

INVENTOR:
Walter Wright
BY
ATTORNEY

UNITED STATES PATENT OFFICE.

WALTER WRIGHT, OF NEW YORK, N. Y., ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,271,982.     Specification of Letters Patent.     Patented July 9, 1918.

Application filed December 1, 1911. Serial No. 663,217.

*To all whom it may concern:*

Be it known that I, WALTER WRIGHT, a citizen of the United States, residing in New York city, in the county of New York and State of New York, have invented certain new and useful Improvements in Combined Type-Writing and Computing Machines, of which the following is a specification.

This invention relates to a pick-up mechanism for traversing the traveling element of a computing head or totalizer in a combined typewriting and computing machine of the Underwood-Wright type, and is an improvement on the application of Wright and Degener, No. 543,603, filed February 12, 1910.

In a combined typewriting and computing machine, the columns of numbers to be written and computed are generally spaced apart, and often interspersed or separated by descriptive matter, so that the aggregate length of the actual number of letter spaces used for numbers to be computed is considerably less than the length of the typewritten line, and thus of the carriage. Even in the case where a computing head is used to add vertically each individual column of numbers, it is unnecessary to have a computing head or totalizer of equal length to that of the typewritten line or that of the carriage. Inasmuch as the traveling element of the computing head should travel concomitantly with the carriage of the typewriter when computing and remain stationary when not computing, I have made provision, when a shorter totalizer or computing head than the carriage is used, for a pick-up mechanism which will cause a movement of the traveling element corresponding to that of the carriage when the machine is writing and computing numbers, and which will allow the carriage to travel freely when not computing, while the traveling element remains behind.

By this arrangement, it is possible to obtain a greater equivalent capacity by using a single long totalizer of a given number of wheels than would be available from the use of a number of small totalizers, the aggregate sum of whose wheels equal the number of wheels in the single long totalizer. With a single totalizer, any variety of computing columns can be used, either limited to one digit, or two digits, or any number of digits up to the capacity of the long totalizer. With a number of small totalizers, each must be capable of computing the maximum sum desired, which is generally 999,999.99. It will be seen then that if a column whose greatest number is not over 99 is needed to be computed, many computing wheels will necessarily be idle. In the present invention with a single long totalizer, only one or two computing wheels need be idle for each computing zone or column.

A feature of this invention is to provide a mechanism which will automatically pick up the traveling element of a computing head or totalizer at predetermined points in the travel of the typewriter carriage, and drop said traveling element at other predetermined points corresponding respectively to the beginning and end of columns of computation.

Another feature of this invention is to lock the traveling element of the computing head in any stationary position against accidental movement when not being traversed, and also to automatically release the traveling element of the computing head at the actuation of the pick up mechanism, to traverse the traveling element.

A further feature of this invention is to enable the rendering of a pick-up mechanism ineffective to traverse the traveling element of a computing head when it is desired to typewrite without computing.

The invention is illustrated in connection with an Underwood-Wright combined typewriting and computing machine in which a master wheel is given a rotation, when a numeral key is struck, of an extent corresponding to the particular numeral key. A relative movement is provided between the master wheel and a series of computing wheels arranged side by side, so that the master wheel will coöperate successively with each computing wheel in the series as the numeral keys are successively struck, whereby the computation will be registered up on the dial wheels operated by the computing wheels.

In this case, the master wheel is shown to be stationary, and the computing head casing carrying the series of computing and dial wheels is shown to be traveling, in order to obtain the relative movement between the master wheel and the computing wheels.

The carriage of the typewriting mechanism is provided with a rack movably mounted thereon, so as to swing into and out of coöperation with a pick-up dog carried by some part of the traveling element of the computing head or totalizer, which in this instance is shown to be the casing containing the computing and dial wheels.

The rack is also provided with slots located at letter space intervals from each other, so as to carry, at any point corresponding to a letter space on the work sheet on the carriage, actuators in the form of adjustable, interchangeable and reversible lugs, which, when placed in one position, will actuate a shifter in one direction, and when placed in another position, will actuate the shifter in the opposite direction, so that the frame carrying the rack will swing to move the rack out of and into engagement with the dog on the computing head, enabling said computing head to respectively remain stationary and travel with the carriage.

The swinging frame, concomitantly with the connecting and disconnecting movement of the rack, enables the tilting of a locking pawl to respectively disengage and engage a locking rack carried by the traveling element of a computing head, thereby respectively permitting and preventing the movement of said traveling element.

A throw-out is provided in the form of a cam lever, which shifts the swinging frame, and thus the rack carried thereby, to a position where the latter cannot engage the pick-up dog. The throw-out is automatically locked by a spring in either position of adjustment.

Other features and advantages will hereinafter appear.

In the accompanying drawings.

Referring more particularly to the separate parts of this invention as embodied in the form shown in the drawings, 1 indicates letter keys and 2 numeral keys, which are mounted on key levers 3 and actuate, through the intermediary of bell cranks 4, type bars 5, so as to swing the latter up rearwardly against the front side of a platen 6 mounted to rotate on a carriage 7, which travels on ways 8 under the control of an escapement mechanism 9, which is released, at the actuation of each character key, to feed the carriage step-by-step in a manner common to an Underwood typewriter.

As described in the prior application of Wright and Degener No. 543,603, filed Feb. 12, 1910, each of the numeral keys 2 is adapted to pull on a link 10, so as to rock a bell crank 11, thereby drawing on a lever 12 through the intermediary of a link 13, so as to rock said lever 12 about its pivot 14, whereby a jack 15 carried by said lever will project one of a series of pins 16 mounted on an index or valuating wheel 17. These pins 16 are arranged to normally stand opposite to a series of jacks 15, of which there is one for each of the numeral keys from "1" to "9." The pins 16 are located at variable distances from an escapement wheel 18, which is locked, by the engagement of a second escapement wheel 19, with locking projections 20 on a shaft 21.

The shaft 21 is rocked at each actuation of a numeral key, so as to permit the rotation of the escapement wheels 18 and 19, and thus of the valuating or index wheel 17, until the next projected pin comes in engagement with the escapement wheel 18. The rocking of the shaft 21 may be accomplished by the bell crank 12 engaging a collar 120 and pressing the same to one side against the tension of a spring 121, so as to rock a lever 122 connected to this collar and also connected to an arm 123 on the rock shaft 21 through the intermediary of a link 125. The spring 121 will return the collar and the rock shaft 21 after the pressure on the numeral key has been removed.

The above mechanism may be termed the "index escapement or valuating mechanism," inasmuch as it controls the extent of rotation of a master wheel 22 provided in a computing head or totalizer 23. The connection between the valuating wheel 17 and the master wheel 22 may be of any suitable character, such as that shown and described in aforesaid application No. 543,603, and it is not considered necessary to illustrate and describe the same in this case. The connection is such, however, that as each of the numeral keys is actuated, it will cause a rotation of the master wheel 22 in the computing head 23 an amount corresponding to the particular value of the numeral key. The master wheel in this instance is shown to be stationary and to operate *seriatim* each one of a series of computing wheels 24 provided in the computing head 23, the casing 25, which contains the computing wheels 24, being moved step-by-step so as to bring the master wheel 22 successively in engagement with each of the computing wheels 24.

The computing wheels 24 are provided with inwardly projecting teeth, which form internal gears meshing with the master wheel 22. These computing wheels 24 are likewise provided with external teeth, which form external gears 26, which mesh with corresponding gears 27 carrying dial wheels 28 adapted to exhibit the numerals run up by the numeral keys through an opening 29 in the casing 25. A complete rotation of each computing wheel 24 is carried to the next higher computing wheel by means of tens carrying mechanism, indicated generally at 30, which may be of any suitable character, such as that shown and described in aforesaid application No. 543,603.

As shown in the drawings, the computing head 25 is of a type adapted to successively compute individual vertical columns, and might be considered to embody a series of individual vertical column computing heads arranged side by side. Inasmuch as the computed columns occupy generally, in the aggregate, less actual space than the space of the typewritten line, the computing head need not be as long as the typewritten line, and thus not as long as the carriage itself. Inasmuch as the carriage, however, travels its full length. it is unnecessary to permit the travel of the computing head 23 except at such times as it is desired to compute. To enable this intermittent traveling of the traveling element of the computing head, which in this instance is shown to be the casing carrying the computing and dial wheels, there is provided a pick-up mechanism, which embodies a rack 31 carried by the carriage and a dog 32 capable of engaging with teeth 33 located at letter space intervals on the rack 31.

The dog 32 is mounted on the traveling element of the computing head, which in this instance is the casing 25. The casing 25 may be supported in any suitable manner as by means of rollers 34, which run on tracks or rails 35. The rack 31 is movably mounted on the carriage 7 so that it can be swung into and out of engagement with the dog 32. The method of mounting the rack 31 may be of any suitable character, and in this instance is shown to be accomplished by a frame 36, which is pivotally mounted on the carriage frame 7 and embodies a plurality of hangers 37 pivotally mounted at 38 on the carriage and connected together by a rail 39. The weight of the frame 36 and the rack 31 carried thereby, is sufficient to normally force the teeth 33 of the rack 31 in engagement with the dog 32. In order to force the teeth 33 out of engagement with the dog 32, there is provided a shifter 40, which is shown in the form of a lever pivoted at 41 and having an off-set finger 42, which can engage the rail 39 at any position of the carriage 7. To actuate the shifter 40, it is provided with a following roller 43, which, during the movement of the carriage, will be actuated toward the carriage by the short side 45 of an actuator 46, shown in the form of a lug detachably, reversibly and adjustably connected to the rack bar 31 by engaging in pairs of slots 47 and 48 arranged at letter space intervals.

Figure 5:
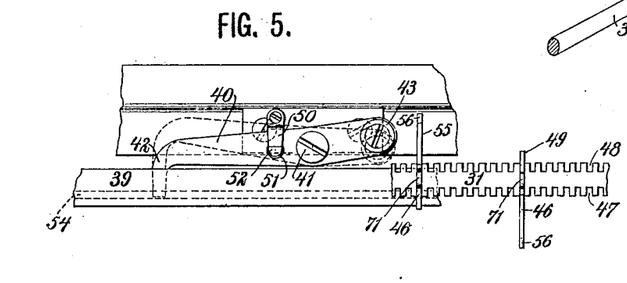
Fig. 5 is a fragmentary top plan view.

The position of a lug arranged to engage the follower 43, so as to force the rack 31 out of engagement with the dog 32, is shown at 49 in Fig. 5. When the shifter 40 has been once actuated by a lug 46 in this manner, it is held in its disconnecting position by a detent 50, which includes a member 51 on the shifter lever 40 and a spring latch or detent 52, on the fixed portion of the frame, engaging with said member. It will be noted that the rail 39 is provided on its inner side throughout its length with an inclined or cam surface 53 which the finger 42 of the shifter 40 will engage when it is forced outwardly to disconnect the rack 31 from the dog 32. It will be seen that this action will be in the nature of a cam action forcing the rail 39 upwardly until the end of the finger 42 rests in a groove 54 provided on the under side of the rail. This groove is so formed that when the finger 42 has once entered the same, it will support the rail 39, and thus the rack 31, in its disconnected position.

Figure 6:
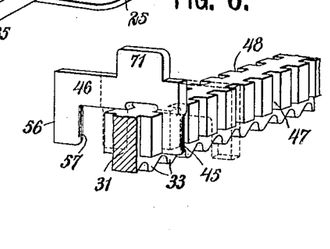
Fig. 6 is a fragmentary perspective view showing in full and dotted lines the two positions of the actuators or lugs.
Figures 7, 8:
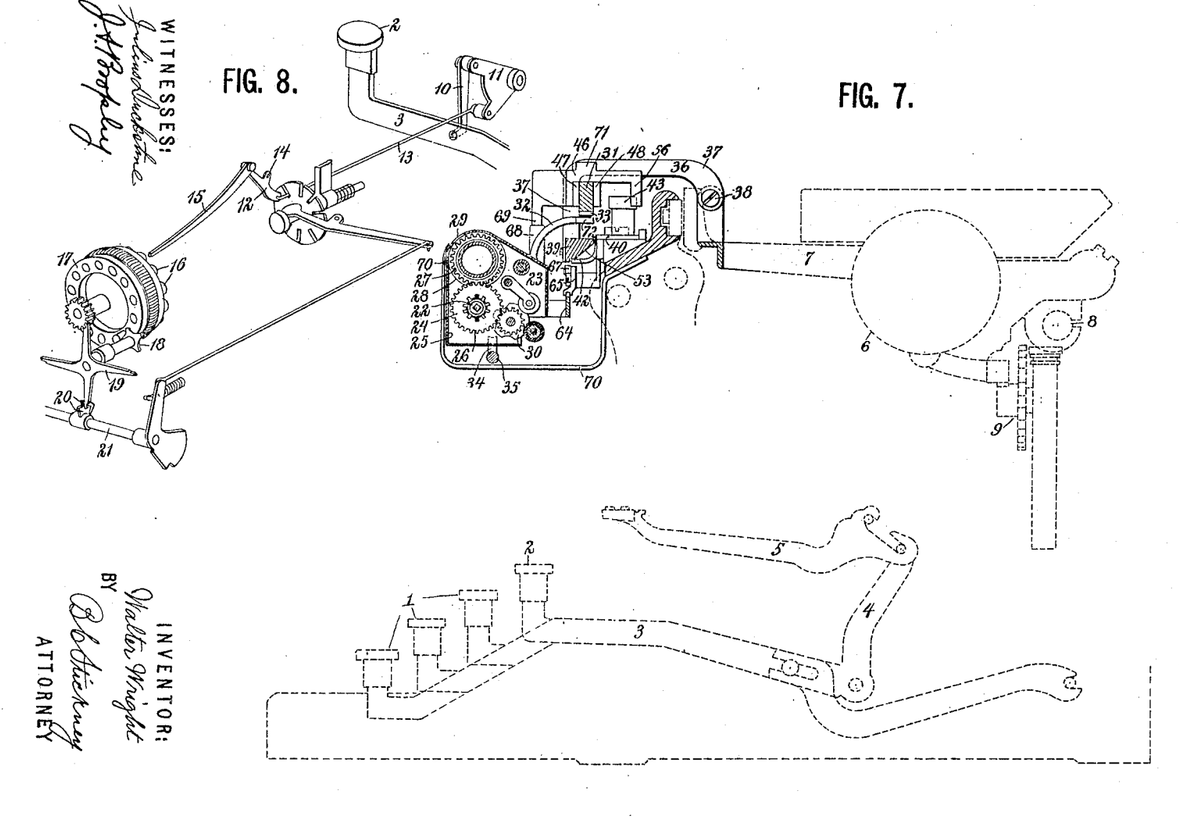
Fig. 7 is a fragmentary vertical section, giving a general view of the relative arrangement of the typewriting mechanism to the computing mechanism.
Fig. 8 is a diagrammatic perspective view showing the mechanism whereby the extent of rotation of the master wheels is controlled from the numeral keys.

In order to return the shifter from the full line position shown in Fig. 5 to the dotted line position so as to permit the rack 31 to fall in engagement with the dog 32, the lug actuators 46 may be reversed to the position shown at 55 in Fig. 5, corresponding also to that shown in Fig. 6, where it will be seen that an extension leg 56 provided on the lug is located in spaced relation from the rack 31, so as to permit the following roller 43 to pass between this extension leg and the rack and be forced toward the rack by a cam edge 57 provided on this leg.

Figures 1, 2:
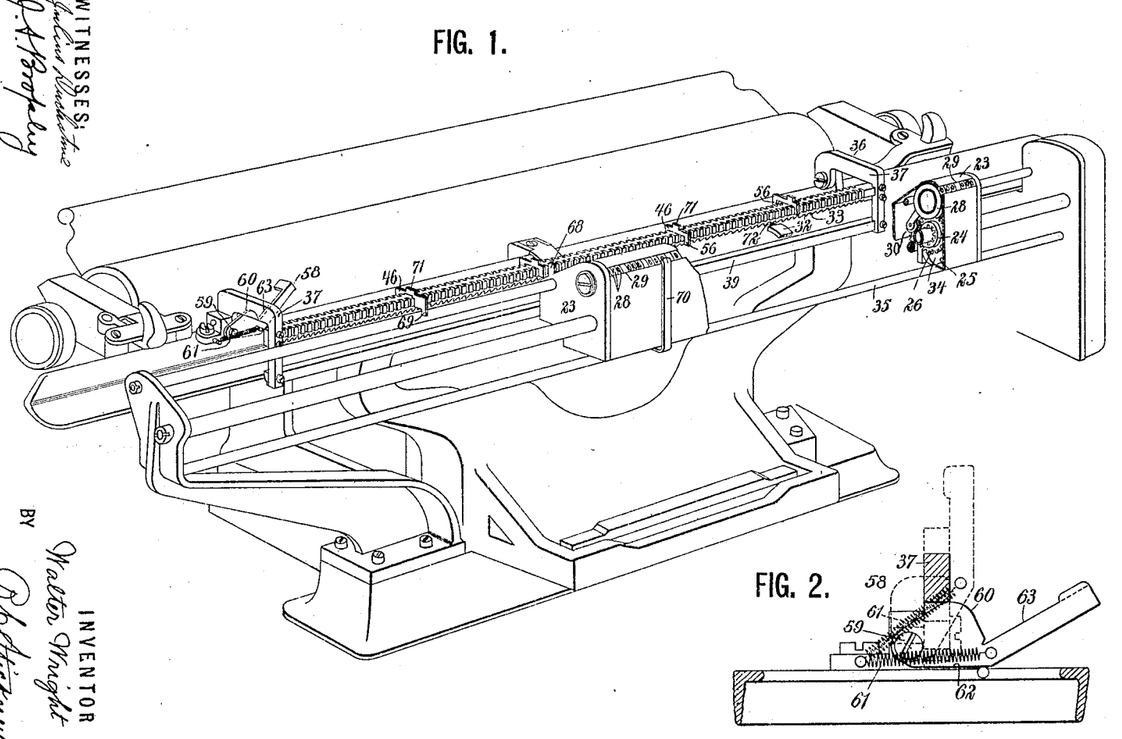
Figure 1 is a perspective view partly broken away to show the underlying structure, and showing in general the connection of a totalizer or computing head with the typewriter carriage.
Fig. 2 is a detail transverse section, showing in full and dotted lines the positions of the throw-out which shifts the connection between the carriage and the computing head to an ineffective position.
Figures 3, 4:
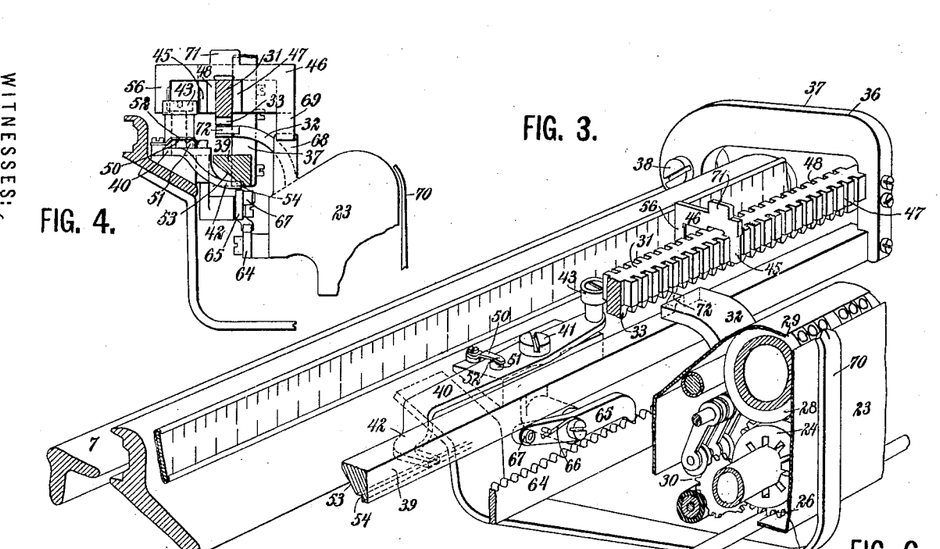
Fig. 3 is an enlarged fragmentary perspective view showing in detail the pick-up mechanism which connects the carriage with the traveling element of the computing head.
Fig. 4 is a fragmentary vertical transverse section.

For the purpose of rendering the pick-up mechanism between the carriage and the computing device ineffective, there is provided a throw-out indicated at 58, which is shown in the form of a cam lever pivoted at 59 and having a cam surface 60 adapted to engage under one of the hangers 37, to raise the whole frame 36, and the parts carried thereby, to such a position that the teeth 33 on the rack 31 will be unable to drop into engagement with the dog 32. It will be noted that the cam lever can be detained in either position of adjustment by a spring 61, which is secured at one end to a portion of the carriage frame, and at its other end to the cam lever, in such a position that it will swing to either side of the pivot 59 of the cam lever, when the latter is swung to its two positions of adjustment. This detaining action is aided by the fact that a portion of the cam lever, indicated at 62, will rest on the frame of the carriage in one position, and an angular portion 63 of the lever will rest against the side of the hanger 37 in the other position. This action is clearly shown in Fig. 2.

When the throw-out is in use to render the pick-up mechanism ineffective, and also when the throw-out is not in use, and the pick-up mechanism is disconnected through the actuation of the shifter 40, it is desirable to lock the traveling element of the computing head against accidental movement. For this purpose, there is secured to the traveling element a locking rack 64, which is engaged by a locking pawl 65 normally thrust to its engaging position by a spring 66. This locking pawl 65, however, is provided with a contact roll 67, whereby, when the frame 36 falls to effect a connection of the rack 31 with the dog 32, the rail 39 will engage with this contact roll 67 and force the toe of the pawl 65 out of locking engagement with the locking rack 64, so as to permit the movement of the traveling element of the computing head.

While the connection of the rack 31 with the dog 32 might be depended upon to return the traveling element of the computing head during the return motion of the carriage, it may be desirable to make the return sure, and for this purpose the traveling element of the computing head is provided with an extension or lug 68, which projects upwardly to a position where it can readily be engaged by an enlargement 69 on one of the lugs or actuators 46 located at such a position that it will completely return the traveling element when the carriage is completely returned.

The relative position of the master wheel to the dial and computing wheels of the computing head may be indicated by a pointer 70 secured to a fixed portion of the frame and located in juxtaposition to the opening in the casing through which the dial wheels are viewed.

To eliminate the intermittent connection between the traveling element of the computing head and the carriage, and cause a positive continuous connection, any one of the actuators or lugs 46 can be reversed, that is to say, turned bottom side uppermost, so that a tongue 71 thereon will engage with a tooth 72 on the dog 32.

The operation of the device will be readily understood when taken in connection with the above description. We will assume that the operation starts with the pick-up mechanism disconnected so that the carriage is free to travel without carrying the traveling element of the computing head. In this relation, any suitable matter can be written on the work sheet without moving the traveling element of the computing head. When the computation starts, that is to say, when the numeral keys are actuated to begin a computation, the first actuator or lug 46, arranged in the position indicated at 55 in Fig. 5, will come into contact with the following roller 43, so that the cam surface 57 on the extension lug 56 thereof will force said following roller toward the rack 31, thereby removing the finger 42 from engagement with the groove 54 in the rail 39, so that said rail 39, together with the frame 36, of which it forms a part, and the rack 31 carried thereby, will be permitted to fall downwardly and inwardly until the teeth 33 engage the tooth of the dog 32 on the traveling element of the computing head.

When the frame 36 and the rail 39 fall down to this position, the under side of the rail 39 will engage the contact roller 67, so as to remove the toe of the locking pawl 65 from engagement with the teeth of the locking rack 64, thereby permitting the travel of the traveling element of the computing head. At the end of a number to be computed, or at the end of a certain column written on the work sheet on the carriage, another actuator or lug 46 will be arranged in one of the letter space slots on the rack 31 in a position indicated at 49, where the short end thereof having the rounded edge 45 will be in a position to engage the following roller 43, so as to force it from the dotted line position indicated in Fig. 5 to the full line position, whereby the finger 42 on the shifter 40 will engage the cam surface 53 and gradually force the rail 39 outwardly and upwardly until the teeth 33 on the rack 31 are forced out of engagement with the dog 32. When this occurs, the end of the finger 42 will have entered the groove or channel 54 so that it will support the frame 36 and the rack 31 carried thereby in the disconnected position of the rack. The shifter 40 will be held in its shifted position by means of the detent 50. The instant the rack 31 rises, so as to disengage the teeth 33 from the dog 32, the spring 66 will act to force the toe of the locking pawl 65 into engagement with the locking rack 64 by virtue of the fact that the rail 39 has been removed from its depressing contact with the contact roller 67.

If it be desired to compute in a second column, a second pick-up lug 46 is inserted on the rack 31 at such a position that the numbers in the second column will not be inserted in the totalizer until the totalizer has been picked up by the typewriter carriage and carried idly along several letter spaces in said second column. This will prevent the numbers in the second column from overlapping, by carrying over, or otherwise, into the first column. The number of letter-spaces in this idle travel usually need not be great, and never need be more than the number of digits in the total to be obtained. In other words, the operative in using this machine is not confronted with the necessity of having a large stock of expensive totalizers of assorted sizes and of being obliged to select a totalizer having the proper number of wheels for each new job of tabulation, but has only to adjust the lugs 46 on the racks at such intervals as to cause the typewriter carriage to select groups of wheels of the desired lengths in the single long totalizer 23.

To disconnect the totalizer from the typewriter carriage after the numbers have been written and computed in the second column, a second disconnect lug 46 is inserted in the rack 31. Similar lugs 46 may be placed in the rack 31 for any desired number of columns within the capacity of the mechanism.

The return motion of the traveling element may be obtained by the enlargement 69 on one of the actuators 46 engaging the extension 68 on the return motion of the carriage.

If it is desired to connect the traveling element of the computing head continuously with the traveling carriage, without the intermittent connection and disconnection, one of the actuators or lugs 46 may be reversed, so as to permit the tongue 71 thereon to engage with the tooth 72 of the dog 32 to drive the totalizer forward, while the enlargement 69 will return the totalizer.

Variations may be resorted to within the scope of the invention, and portions of the improvements may be used without others.

Having thus described my invention, I claim:

1. The combination with a typewriter carriage, of a computing head having a traveling element, a pick-up means having parts engageable to cause said traveling element to move with said carriage, a shifter controlling the connection of said parts of said pick-up means, and a series of actuators for successively moving said shifter in opposite directions.

2. The combination with a typewriter carriage, of a computing head having a traveling element, a pick-up means having parts engageable to cause said traveling element to move with said carriage, a shifter controlling the connection of said parts of said pick-up means, and a series of actuators carried by said pick-up means for moving said shifter to cause the connection and disconnection of the parts of said pick-up means.

3. The combination with a typewriter carriage, of a computing head having a traveling element, a pick-up means having parts engageable to cause said traveling element to move with said carriage, a shifter normally controlling the connection of said parts of said pick-up means, a throw-out, operative independently of the position of said traveling element, for rendering said pick-up means ineffective, and means for holding said throw-out in either position of adjustment.

4. The combination with a typewriter carriage, of a computing head having a traveling element, a pick-up means having parts engageable to cause said traveling element to move with said carriage, a shifter controlling the connection of said parts of said pick-up means, and a series of lugs to actuate said shifter, some of said lugs being effective to move said shifter in one direction, and others of said lugs being effective to move said shifter in the opposite direction.

5. The combination with a typewriter carriage, of a computing head having a traveling element, a pick-up means having parts engageable to cause said traveling element to move with said carriage, a shifter controlling the connection of said parts of said pick-up means, and a series of lugs to actuate said shifter; certain of said lugs being effective to move said traveling element independently of said pick-up means.

6. The combination with a typewriter carriage, of a computing head having a traveling element, a pick-up means having parts engageable to cause said traveling element to move with said carriage, a shifter controlling the connection of said parts of said pick-up means, and a series of lugs to actuate said shifter; said lugs being reversible to variably actuate said shifter.

7. The combination with a typewriter carriage, of a computing head having a traveling element, means normally tending to connect said traveling element with said carriage, and a releasable lock for preventing such connection, said connecting means being effective when released by said lock to connect said traveling element with said carriage, irrespective of their relative character-space relation at the time.

8. The combination with a typewriter carriage, of a computing head having a traveling element, means normally tending to connect said traveling element with said carriage, a lock for preventing the connection of said traveling element with said carriage, and a lug traveling with said carriage for releasing said lock.

9. The combination with a typewriter carriage, of a computing head having a traveling element, a pick-up means having parts engageable to cause said traveling element to move with said carriage, including a rack and a dog coöperating with said rack, said rack and said dog tending normally to engage with each other, a shifter for forcing said rack and said dog out of engagement with each other, and a series of lugs carried by said rack for controlling the movements of said shifter.

10. The combination with a typewriter carriage, of a computing head having a traveling element, a pick-up means having parts engageable to cause said traveling element to move with said carriage, including a rack and a dog coöperating with said rack, said rack and said dog tending normally to engage with each other, a shifter for forcing said rack and said dog out of engagement with each other, and a series of lugs carried by said rack for controlling the movements of said shifter; said lugs being adjustable to vary their effect.

11. The combination with a carriage, of a frame pivotally connected to said carriage, a rack secured to said frame, a computing head having a traveling element, a dog carried by said traveling element, a shifter for swinging said frame, a series of lugs carried by said rack to move said shifter in opposite directions, and a lock for holding said shifter in its adjusted position.

12. The combination with a carriage, of a computing head having a traveling element, means for intermittently connecting said traveling element with said carriage, a locking rack, and a pawl adapted to intermittently engage said rack to secure said traveling element against accidental movement when disconnected from said carriage.

13. The combination with a carriage, of a computing head having a traveling element, means for intermittently connecting said traveling element with said carriage, a locking rack, and a pawl adapted to intermittently engage said rack to secure said traveling element against accidental movement, said pawl being released from engagement with said rack on the connection of said traveling element with said carriage by said means.

14. The combination with a carriage, of a computing head having a traveling element, means for connecting said traveling element with said carriage, said connecting means including a swinging frame, and a pawl-and-ratchet mechanism for locking said traveling element against movement, said frame operating to disconnect said pawl-and-ratchet mechanism when said means connect said traveling element with said carriage.

15. The combination with a carriage, of a computing head having a traveling element, a plurality of hangers pivotally mounted on said carriage, a rail on said hangers, a bar secured to said hangers and having teeth arranged at letter space intervals, a dog carried by said traveling element adapted to engage said teeth to cause the carriage and traveling element to travel together from any letter-space, and means engaging said rail to shift said bar so as to disengage said teeth from said dog.

16. The combination with a carriage, of a computing head having a traveling element, a plurality of hangers pivotally mounted on said carriage, a cam rail secured to said hangers, a bar secured to said hangers and having teeth thereon arranged at letter space intervals, a dog mounted on said traveling element and adapted to engage said teeth to connect said traveling element with said carriage, a plurality of lugs disposed on said bar, some of said lugs being arranged in one position and others of said lugs being arranged in another position, and a lever pivotally mounted so as to engage said rail at one end and be engaged by said lugs at its opposite end, so as to enable said lugs, on the movement of said carriage, to shift said rail and thus said bar.

17. The combination with a carriage, of a computing head having a traveling element, a plurality of hangers pivotally mounted on said carriage, a cam rail secured to said hangers, a bar secured to said hangers and having teeth thereon arranged at letter space intervals, a dog mounted on said traveling element and adapted to engage said teeth to connect said traveling element with said carriage, a plurality of lugs disposed on said bar, some of said lugs being arranged in one position and others of said lugs being arranged in another position, a lever pivotally mounted so as to engage said rail at one end and be engaged by said lugs at its opposite end, so as to enable said lugs, on the movement of said carriage, to shift said rail and thus said rack, a locking bar carried by said traveling element, and a pawl engaging said locking rack to prevent the accidental movement of said traveling element.

18. The combination with a carriage, of a computing head having a traveling element, a plurality of hangers pivotally mounted on said carriage, a cam rail secured to said hangers, a bar secured to said hangers and having teeth thereon arranged at letter space intervals, a dog mounted on said traveling element and adapted to engage said teeth to connect said traveling element with said carriage, a plurality of lugs disposed on said bar, some of said lugs being arranged in one position and others of said lugs being arranged in another position, a lever pivotally mounted so as to engage said rail at one end and be engaged by said lugs at its opposite end, so as to enable said lugs, on the movement of said carriage, to shift said rail and thus said bar, a locking rack carried by said traveling element, and a pawl engaging said locking rack to prevent the accidental movement of said traveling element; said pawl underlying said rail so that when said teeth engage said dog said pawl will be disengaged from said locking rack.

19. The combination with a carriage, of a computing head having a traveling element, means for connecting said traveling element with said carriage, and lugs controlling said means, said lugs having cam portions arranged at different distances from the point of support of said lugs, whereby said lugs can be reversed to perform a different action.

20. The combination with a carriage, of a computing head having a traveling element, means for connecting said traveling element with said carriage including a rack, a series of lugs arranged on said rack at predetermined intervals, certain of said lugs having legs arranged in spaced relation from said rack so as to permit the passage of a member between the rack and said legs.

21. The combination with a computing mechanism having a traveling element, of a typewriter carriage forming traversing means for said traveling element, a connection from said carriage to said element adapted to be effective or ineffective, locking means for said traveling element, and means alternating the effectiveness of the connection to said traversing means and said locking means.

22. The combination with a computing mechanism having a traveling element, of a carriage, two members, one on said carriage and the other on said traveling element, engaging to connect said traveling element to said carriage to move therewith, one of said members being a rack and the other of said members being a dog, and a series of lugs on said rack for controlling the engagement of said rack with said dog.

23. The combination with a computing mechanism having a traveling element, of connecting means for effecting the travel of said element, and an actuator for causing said connecting means to be ineffective, said actuator being reversible to change the character of its action.

24. The combination with a carriage, of a computing mechanism having a traveling element, parts engaging to connect said traveling element to move with said carriage, one of said engaging parts including a rack, a cam rail extending parallel with said rack and connected thereto, and a shifter engaging said cam rail to operate said rack.

25. The combination with a carriage, of a computing mechanism having a traveling element, parts engaging to connect said traveling element to move with said carriage, one of said engaging parts including a rack, a cam rail extending parallel with said rack and connected thereto, and a shifter engaging said cam rail to operate said rack, said cam rail having a ledge to enable it to rest firmly on said shifter, so that said shifter may hold it in one position.

26. The combination with typewriting mechanism including a traveling carriage and a frame pivoted thereon, of a rack bar forming part of said frame, a computing device including a part engaged and moved by said rack bar when said frame is in one position, dogs settable on said rack bar to either of two positions, a shifter pivoted on the frame of the machine, so that it may occupy either of two positions, a tappet forming part of said shifter and adapted when in one position to be struck by any dog in one position but not by any dog in the other position, and a finger forming part of said shifter adapted, when moved to one of its positions, to strike a cam on said frame to lift said frame with its rack bar to disconnect said carriage and said computing device.

27. The combination with typewriting mechanism including a traveling carriage and a frame pivoted thereon, of a rack bar forming part of said frame, a computing device including a part engaged and moved by said rack bar when said frame is in one position, dogs settable on said rack bar, each dog settable so that it may have two functions, a shifter pivoted on the frame of the machine, a finger forming part of said shifter adapted to lift said rack bar, a tappet forming part of said shifter adapted to be moved by each dog to so lift said rack bar when the dog occupies one position and adapted to be moved to ineffective position when said dog occupies the other position, and holding means for holding the shifter set in either position to connect or disconnect said carriage and computing device.

28. The combination with typewriting mechanism, including a carriage and a frame, of a computing device, a rack bar swingable on said carriage to connect or disconnect said computing device, and means on said rack bar for controlling its swinging.

29. In a combined typewriting and computing machine, the combination with a traveling carriage and a swinging rack bar on said carriage, of a totalizer, means operated by said swinging rack bar to cause said totalizer to be intermittently picked up and dropped thereby, and manually settable means for holding said rack bar in its ineffective position.

30. The combination with a traveling carriage, of a computing device having a traveling element, a rack bar swingably mounted on said carriage to determine the connection and disconnection of said traveling element with said carriage, means on said rack bar for controlling its swinging, and detent means operated from said rack bar to hold said traveling element against movement when said bar is ineffective to cause a traveling movement of said traveling element.

31. In a combined typewriting and computing machine, the combination with a typewriter carriage and a computing mechanism having a traveling element, of a pick-up device comprising a tappet, parts shifted thereby on movement of said carriage in one direction to cause said traveling element to move therewith, and a second tappet to shift said parts on further movement of said carriage in the same direction to effect the release of said traveling element, said tappets being adjustably mounted with respect to said carriage for the purpose of variably predetermining the location and width of a computing zone, a throw-out device normally permitting said tappets to control the effectiveness of said pick-up device but operative at will to render said pick-up device ineffective and to insure the release of said traveling element irrespective of the position of said carriage, and a holding device comprising parts rendered effective on movement of said pick-up device to release said traveling element, and serving to retain said traveling element in the position occupied thereby when released from said carriage.

32. In a combined typewriting and computing machine, the combination with a typewriter carriage and a computing mechanism having a traveling element, of a pick-up device comprising parts effective on movement of said carriage in one direction to engage and cause said traveling element to move therewith, means operative on further movement of said carriage in the same direction to effect the release of said traveling element by disengagement of said parts, and a holding device comprising parts rendered effective on disengagement of said parts of said pick-up device to engage and retain said traveling element in the position occupied thereby when released from said carriage.

33. In a combined typewriting and computing machine, the combination with a typewriter carriage and a computing mechanism having a traveling element, of a pick-up device comprising parts effective on movement of said carriage in one direction to engage and cause said traveling element to move therewith, means operative on further movement of said carriage in the same direction to effect the release of said traveling element by disengagement of said parts, a throw-out device normally permitting engagement of said parts of said pick-up device but operative at will to effect the disconnection of said parts and to hold said parts disconnected irrespective of the position of said carriage, and a holding device comprising parts rendered effective on disengagement of said parts of said pick-up device to engage and retain said traveling element in the position occupied thereby when released from said carriage.

34. In a combined typewriting and computing machine, the combination with a typewriter carriage and a computing mechanism having a traveling element, of a pick-up device comprising parts engageable to cause said traveling element to move with said carriage, a shifter to effect engagement of said parts by movement to one position and disengagement thereof by movement to another position, and means to hold said shifter in either of said two positions.

35. The combination with a typewriter carriage, and means for imparting thereto a step-by-step character-spacing movement, of a computing head having a traveling element, a pick-up means having parts engageable to cause said traveling element to move with said carriage, including a rack having teeth spaced in accordance with the character-spacing of said carriage and a dog coöperating with said rack, said rack and said dog tending normally to engage with each other, and a lock for holding said rack and said dog out of engagement to permit said dog to move clear of the teeth of said rack when said lock is effective.

36. The combination with a typewriter carriage, and means for imparting thereto a step-by-step character-spacing movement, of a computing head having a traveling element, a pick-up means having parts engageable to cause said traveling element to move with said carriage, including a rack having teeth spaced in accordance with the character-spacing movement of said carriage, and a dog coöperating with said rack, said rack and said dog tending normally to engage with each other, a lock for holding said rack and said dog out of engagement to permit said dog to move clear of the teeth of said rack when said lock is effective, and means for releasing said lock to permit said dog and rack to engage in any desired character-space relation.

37. The combination with a typewriter carriage, and means for imparting thereto a step-by-step character-spacing movement, of a computing head having a traveling element, a pick-up means having parts engageable to cause said traveling element to move with said carriage, including a rack having teeth spaced in accordance with the character-spacing movement of said carriage and a dog coöperating with said rack, said rack and said dog tending normally to engage with each other, and a shifter for forcing said rack and said dog apart and holding them out of engagement with each other to permit said dog to move clear of the teeth of said rack when said shifter is effective.

38. The combination with a typewriter carriage, and means for imparting thereto a step-by-step character-spacing movement, of a computing head having a traveling element, a pick-up means having parts engageable to cause said traveling element to move with said carriage, including a rack having teeth spaced in accordance with the character-spacing movement of said carriage and a dog coöperating with said rack, said rack and said dog tending normally to engage with each other, a shifter for forcing said rack and said dog apart and holding them out of engagement with each other to permit said dog to move clear of the teeth of said rack when said shifter is effective, and an actuator, movable in accordance with the movement of said carriage, for effecting a movement of said shifter.

39. The combination with a typewriter carriage, and means for imparting thereto a step-by-step character-spacing movement, of a computing head having a traveling element, a pick-up means having parts engageable to cause said traveling element to move with said carriage, including a rack having teeth spaced in accordance with the character-spacing movement of said carriage and a dog coöperating with said rack, said rack and said dog tending normally to engage with each other, a shifter for forcing said rack and said dog apart and holding them out of engagement with each other to permit said dog to move clear of the teeth of said rack when said shifter is effective, and a series of lugs movable in accordance with the movement of said carriage for alternately moving said shifter in opposite directions to its effective and ineffective positions.

40. The combination with a carriage, and means for imparting thereto a step-by-step character-spacing movement, of a rack carried by said carriage and having teeth spaced in accordance with the character-spacing movement of said carriage, a computing head having a movable element, a dog connected to said movable element, and means for causing said rack to be brought automatically into engagement with said dog at predetermined intervals in the travel of said carriage.

41. The combination with a carriage, and means for imparting thereto a step-by-step character-spacing movement, of a rack carried by said carriage and having teeth spaced in accordance with the character-spacing movement of said carriage, a computing head having a movable element, a dog connected to said movable element, means for causing said rack to be brought automatically into engagement with said dog at predetermined intervals in the travel of said carriage, and separately settable means for causing the disengagement of said rack from said dog at other predetermined intervals in the travel of said carriage.

42. The combination with a carriage, and means for imparting thereto a step-by-step character-spacing movement, of a computing head having a traveling element, a driving rack carried by said carriage and having teeth spaced in accordance with the character-spacing movement of said carriage, a dog carried by said traveling element, means for automatically effecting the connection of said driving rack with said dog, a locking rack carried by said traveling element, the teeth of said locking rack being spaced in accordance with the teeth of said driving rack, and a locking pawl engaging said locking rack to hold said traveling element aginst movement whenever disconnected from said carriage.

43. In a combined typewriting and computing machine, the combination with a typewriter carriage and a computing mechanism including a traveling element, of a pick-up device comprising a dog and a rack, one of said parts being connected with said traveling element and one with said carriage, said pick-up device being effective, when said parts are engaged, to cause said traveling element to move in accordance with the movements of said carriage, a holding device for said traveling element comprising a dog and a rack, one of said parts being connected with said traveling element, the teeth on the rack of said holding device being spaced in accordance with the teeth on the rack of said pick-up device so that said holding device may be effective to retain said traveling element in any position to which it is moved by said carriage, and an operating device common to both the pick-up device and the holding device and serving, when operated to render one of said devices effective, to render the other ineffective, and vice versa.

44. In a combined typewriting and computing machine, the combination with a typewriter carriage and a computing mechanism including a traveling element, of a toothed bar carried by said carriage, a dog carried by said traveling element, said bar and dog being relatively movable from an ineffective relation, in which the teeth of said bar ride clear of said dog, to an effective relation, in which said dog and said teeth engage and effect a driving connection from said carriage to said traveling element, a shifter to control the relative movement of said bar and dog, and a lug carried by said bar to effect a controlling movement of said shifter, said lug being attachable to said bar at a plurality of positions along its length, the spacing of said positions of attachment corresponding with the spacing of the teeth of said bar, so that each point of attachment of said lug will predetermine a definite point in the travel of said carriage at which said traveling element may be connected thereto for movement therewith.

45. In a combined typewriting and computing machine, the combination with a typewriter carriage and a computing mechanism including a traveling element, of a toothed bar carried by said carriage, a dog carried by said traveling element, said bar and dog being relatively movable from an ineffective relation, in which the teeth of said bar ride clear of said dog, to an effective relation, in which said dog and said teeth engage and effect a driving connection from said carriage to said traveling element, a shifter to control the relative movement of said bar and dog to and from their effective relation, and a plurality of lugs carried by said bar to effect the controlling movement of said shifter, said lugs and shifter being so related that alternate lugs will move said shifter in opposite directions, said lugs being severally attachable to said bar at a plurality of positions along its length, the spacing of said positions of attachment corresponding with the spacing of the teeth of said bar, so that each point of attachment of a lug will predetermine a definite but independent point in the travel of said carriage at which said traveling element may be connected thereto for movement therewith or disconnected therefrom.

46. In a combined typewriting and computing machine, the combination with a typewriter carriage and a computing mechanism including a traveling element, of a toothed bar carried by said carriage, a dog carried by said traveling element, said bar and dog being relatively movable from an ineffective relation, in which the teeth of said bar ride clear of said dog, to an effective relation, in which said dog and said teeth engage and effect a driving connection from said carriage to said traveling element, a shifter to control the relative movemenet of said bar and dog, a lug carried by said bar to effect a controlling movement of said shifter, said lug being attachable to said bar at a plurality of positions along its length, the spacing of said positions of attachment corresponding with the spacing of the teeth of said bar, so that each point of attachment of said lug will predetermine a definite point in the travel of said carriage at which a connection with said traveling element may be effected, and a throw-out for effecting a relative movement between said bar and said dog and for holding them in their ineffective relation, and thus preventing engagement of the teeth of said bar with said dog, said throw-out being thus effective at will to prevent a driving connection from said carriage to said traveling element without disturbing the adjustment of said lug.

47. In a combined typewriting and computing machine, the combination with a typewriter carriage and a computing mechanism having a traveling element, of a pick-up device comprising a rack and a dog, said parts being connected, the one to said carriage and the other to said traveling element, one of said parts also being movable from an ineffective position, in which the teeth of said rack are free from engagement with said dog, to an effective position in which said teeth and dog engage to effect a driving connection from said carriage to said traveling element, a shifter to control the movement of said rack to and from its effective position, a bar movable in accordance with the movement of said carriage, a plurality of lugs carried by said bar to effect the controlling movement of said shifter, said lugs and shifter being so related that alternate lugs will move said shifter in opposite directions, said lugs being severally attachable to said bar at a plurality of positions along its length, and a holding device for said traveling element, said holding device comprising a rack and a dog, one of said parts being connected to said traveling element, and one of said parts being movable with respect to the other from an ineffective position in which the teeth of said rack are free from engagement with said dog to an effective position in which said teeth and dog engage and anchor the traveling element, the movable parts of said pick-up and holding devices being so related that movement of one to effective position causes movement of the other to ineffective position, and vice versa, the teeth of the racks of the pick-up and holding devices being spaced to correspond with the spacing of the positions of attachment of said shifter-controlling lugs on said bar, so that each point of attachment of a lug will predetermine a definite but independent point in the travel of said carriage at which said traveling element will be connected thereto for movement therewith or disconnected therefrom, and so that said holding device will be effective to anchor said traveling element at any point at which it is released by said pick-up device.

48. In a combined typewriting and computing machine, the combination with a typewriter carriage and a computing mechanism including a traveling element, of a pick-up device comprising parts carried by said carriage and traveling element, respectively, and engageable to cause said traveling element to move with said carriage, a shifter to control the engagement and disengagement of said parts, and a series of lugs movable in accordance with the movement of said carriage, said series including lugs effective to connect and disconnect said traveling element and said carriage through the intermediary of said shifter and the parts of said pick-up device, and said series also including a lug effective to cause said traveling element to be moved by said carriage through direct engagement between said lug and a part carried by said traveling element.

49. The combination with a carriage, of a computing head including a traveling element, a pick-up device comprising parts connected, respectively, with said carriage and said traveling element and engageable in various relative positions to connect said traveling element with said carriage, a shifter controlling the engagement and disengagement of said parts, a bar carried by said carriage, and a plurality of lugs on said bar, said lugs having legs variably disposed with respect thereto, some of said lugs being so disposed that said legs will engage and move said shifter in one direction, and others of said lugs being so disposed as to engage and move said shifter in the opposite direction.

50. In a combined typewriting and computing machine, the combination with a typewriter carriage and a computing mechanism including a traveling element, of a pick-up device comprising a dog carried by said traveling element and a toothed member connected to said carriage, said toothed member being movable from an ineffective position free from engagement with said dog to an effective position in engagement therewith, a bar movable in accordance with the movement of said carriage, a series of lugs attachable to said bar at various positions along its length, and means controlled by said lugs when attached to said bar in a certain relation therewith, for effecting the movement of said toothed member into and out of engaging relation with said dog, certain of said lugs being attachable to said bar in a reverse relation therewith, to render the same effective as a means for moving said traveling element by direct contact of a part of a reversed lug with said dog.

51. In a combined typewriting and computing machine, the combinattion with a typewriter carriage and a computing mechanism having an element normally at rest but adapted to travel with said carriage, of a pick-up device comprising a part connected with said carriage and a part connected with said traveling element, one of said parts being movable into engagement with the other to connect said traveling element with said carriage, so that a movement of said carriage will effect a like movement of said traveling element when said parts are engaged, and means including a cam member movable in accordance with the movement of said carriage for effecting the engagement of said parts of said pick-up device.

52. In a combined typewriting and computing machine, the combination with a typewriter carriage and a computing mechanism having an element normally at rest but adapted to travel with said carriage, of a pick-up device comprising a part connected with said carriage and a part connected with said traveling element, one of said parts being movable into engagement with the other to connect said traveling element with said carriage, so that a movement of said carriage will effect a like movement of said traveling element when said parts are engaged, a shifter controlling the engagement and disengagement of said parts of said pick-up device, and means, movable relatively to said shifter in accordance with the movement of said carriage, for controlling the operation of said shifter.

53. In a combined typewriting and computing machine, the combination with a typewriter carriage and a computing mechanism having an element normally at rest but adapted to travel with said carriage, of a pick-up device comprising a part connected with said carriage and a part connected with said traveling element, one of said parts being movable into engagement with the other to connect said traveling element with said carriage, so that a movement of said carriage will effect a like movement of said traveling element when said parts are engaged, a shifter controlling the engagement and disengagement of said parts of said pick-up device, and a series of differently-disposed tappets, movable relatively to said shifter in accordance with the movement of said carriage, for successively and variably operating said shifter to render said pick-up device successively effective and ineffective.

54. In a combined typewriting and computing machine, the combination with a typewriter carriage and a computing mechanism having an element normally at rest but adapted to travel with said carriage, of a pick-up device comprising a part connected with said carriage and a part connected with said traveling element, one of said parts being movable into engagement with the other to connect said traveling element with said carriage, so that a movement of said carriage will effect a like movement of said traveling element when said parts are engaged, a shifter controlling the engagement and disengagement of said parts of said pick-up device, and means, movable relatively to said shifter in accordance with the movement of said carriage, for controlling the operation of said shifter, a part of said shifter-controlling means being attachable in different positions, for selectively predetermining the part, in the travel of said carriage, at which the pick-up device shall be effective.

55. In a combined typewriting and computing machine, the combination with a typewriter carriage and a computing mechanism having an element normally at rest but adapted to travel with said carriage, of a pick-up device comprising a part connected with said carriage and a part connected with said traveling element, one of said parts being movable into engagement with the other to connect said traveling element with said carriage, so that a movement of said carriage will effect a like movement of said traveling element when said parts are engaged, a shifter controlling the engagement and disengagement of said parts of said pick-up device, and a series of differently-disposed tappets, movable relatively to said shifter in accordance with the movement of said carriage, for successively and variably operating said shifter to render said pick-up device successively effective and ineffective, said tappets being independently attachable in different positions to independently predetermine the points in the travel of said carriage at which the pick-up device shall become effective and ineffective.

56. In a combined typewriting and computing machine, the combination with a typewriter carriage and a computing mechanism having a traveling element, of a pick-up device comprising a rack mounted on said carriage and a dog carried by said traveling element, said rack being adapted to swing into engagement with said dog at various relative positions of said carriage and said traveling element, said engagement of said rack with said dog serving to connect said carriage to said traveling element and cause it to move in accordance therewith, a shifter controlling the swinging movement of said rack, and actuating means carried by said rack to engage and operate said shifter.

57. In a combined typewriting and computing machine, the combination with a typewriter carriage and a computing mechanism having a traveling element, of a pick-up device comprising parts effective on movement of said carriage in one direction to engage and cause said traveling element to move therewith, means operative on further movement of said carriage in the same direction to effect the release of said traveling element by disengagement of said parts, and a throw-out device normally permitting engagement of said parts of said pick-up device but operative at will to effect the disconnection of said parts and to hold said parts disconnected irrespective of the position of said carriage.

WALTER WRIGHT.

Witnesses:
 PAUL ZIRON,
 LORENZ L. PRITZL.